United States Patent
Cuer et al.

(10) Patent No.: US 8,636,887 B2
(45) Date of Patent: Jan. 28, 2014

(54) METHOD FOR ELECTROKINETIC DECONTAMINATION OF A POROUS SOLID MEDIUM

(75) Inventors: Frédéric Cuer, Cornillon (FR); Axel De Nadaï, Martigues (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 84 days.

(21) Appl. No.: 13/121,102

(22) PCT Filed: Oct. 1, 2009

(86) PCT No.: PCT/EP2009/062747
§ 371 (c)(1),
(2), (4) Date: Apr. 26, 2011

(87) PCT Pub. No.: WO2010/037809
PCT Pub. Date: Apr. 8, 2010

(65) Prior Publication Data
US 2011/0186444 A1    Aug. 4, 2011

(30) Foreign Application Priority Data

Oct. 3, 2008  (FR) ...................... 08 56716

(51) Int. Cl.
*C25F 1/00*    (2006.01)
(52) U.S. Cl.
USPC ........... 204/515; 205/709; 205/710; 205/711; 205/712; 205/717; 205/718; 205/719; 205/720; 205/721; 205/705
(58) Field of Classification Search
USPC ........... 205/705, 709–712, 717–722; 204/515
See application file for complete search history.

(56) References Cited

U.S. PATENT DOCUMENTS

| | | | | |
|---|---|---|---|---|
| 4,836,900 A | * | 6/1989 | Bellanger | 205/705 |
| 5,296,120 A | | 3/1994 | Bennett et al. | |
| 5,405,509 A | * | 4/1995 | Lomasney et al. | 205/688 |
| 2005/0230267 A1 | * | 10/2005 | Veatch et al. | 205/687 |

FOREIGN PATENT DOCUMENTS

| | | |
|---|---|---|
| EP | 0 398 117 A2 | 11/1990 |
| FR | 2 770 839 | 11/1997 |

* cited by examiner

*Primary Examiner* — Arun S Phasge
(74) *Attorney, Agent, or Firm* — Miles & Stockbridge P.C.

(57) ABSTRACT

The invention relates to a method for electrokinetic decontamination of a porous solid medium, which comprises:
 a) extracting the contaminating species present in the solid medium in an electrolyte appearing as an essentially inorganic gel, this extraction being obtained by applying an electric current between two electrodes positioned at the surface and/or in the interior of the solid medium, the contact of at least one of these electrodes with said solid medium being ensured by a layer of said gel,
 b) drying the gel containing the thereby extracted contaminating species until a dry residue is obtained which fractures, and
 c) removing the thereby obtained dry residue from said solid residue.

Applications: decontamination of materials with a cement matrix, notably within the scope of dismantlement of military or industrial installations, in particular nuclear installations, or the rehabilitation of installations likely to have been contaminated by ecotoxic or radiological chemical species; clearing pollution of geological soils, sediments and sludges.

30 Claims, 3 Drawing Sheets

METHOD FOR ELECTROKINETIC DECONTAMINATION OF A POROUS SOLID MEDIUM

TECHNICAL FIELD

The present invention relates to a method for electrokinetic decontamination of a porous solid medium.

With this method, which is based on forced migration, by application of an electric field between two electrodes positioned at the surface of the medium and/or implanted in this medium, of contaminants towards one of these electrodes (cathode for cationic species and for most neutral organic or organometallic compounds, and anode for anionic species), it is possible to remove very efficiently from materials with a cement matrix of the concretes or mortars type, ecotoxic and radiological chemical species (actinides and lanthanides) present in the depth of these materials.

Its use therefore is of a most particular interest for the dismantlement of military or industrial installations, notably nuclear installations, or for rehabilitating installations likely to have been contaminated, because of the nature of the activities which were located therein, by ecotoxic chemical species such as heavy metals or radiological metals.

However, the method of the invention may also be used for cleaning up pollution of porous solid media other than materials with a cement matrix such as for example geological soils, sediments such as harbor sediments, or further dredging sludges before their being discharged in a marine environment.

STATE OF THE PRIOR ART

The materials with a cement matrix because of their composite nature have non-negligible open porosity.

Because of this, materials with a cement matrix which enter the structure of nuclear installations, when they are required to be in contact with radio-elements in a solution (in liquid or gas form), are found to be contaminated in depth by these radio-elements which diffuse within these materials and may be accommodated at several centimeters from their surface.

In this case, decontamination surface treatments are totally ineffective for removing these radio-elements.

During the last two decades, methods for dechloridation and re-alkalinization of reinforced concretes have been developed in order to limit corrosion of the internal frames of these concretes by the chlorides notably present in marine environments, thereby guaranteeing durability of civil engineering structures.

Used for a preventive or curative purpose, these methods consist of extracting the chlorides having diffused into the concrete and of maintaining or re-establishing the pH of the interstitial solution of the concrete to a value greater than 11 by diffusion of alkaline species into this concrete.

Extraction of the chlorides and diffusion of the alkaline species into the concrete are obtained by applying an electric current between the internal frame of the reinforced concrete, which plays the role of a cathode, and an external electrode which is temporarily added onto the skin of the concrete and which plays the role of an anode.

The electric continuity between the external electrode and the skin of the concrete is ensured by an electrolyte which is also used for collecting the chloride ions extracted from the concrete and for providing the basic species intended to diffuse into the latter.

Considering the often complex configuration of civil engineering structures, this electrolyte is typically a humid paste of organic nature such as the one described in European Patent Application published under number 0 398 117 (hereafter reference [1]) which consists in a mixture of cellulose fibers and of a basic solution and which is deposited on the skin of the concrete in a layer with a thickness from 5 to 10 cm. By measuring the resistance between the internal frame of the concrete and the external electrode, it is possible to evaluate the drying degree of the paste related to evaporation of the water which it contains and to predict at what frequency the cellulose fibers have to be re-humidified with the basic solution (on average every 2 or 3 days).

Other methods for regenerating reinforced concretes consists of applying on the skin of the concrete in a prolonged way, an active repair mortar which consists of a hydraulic binder loaded with basic ions, and of metal aggregates.

In this type of method, which is found and described in French Patent Application published under the number 2 770 839 (reference [2] hereafter), the hydraulic binder is used as a conducting paste while the metal aggregates play the role of electrodes.

The system operates without providing any outer electric current. Indeed, the pair formed by the internal frame of the concrete and the metal aggregates forms within the conducting paste a redox pair which produces a current which spontaneously biases this frame and these aggregates, and this bias is sustained by the relative humidity of the paste, by the reserve of ions of the mortar and by the consumption of the metal charges. Ambient humidity is sufficient for re-humidifying the conducting paste.

The methods described above cannot be transposed to the decontamination of materials with a cement matrix entering the structure of nuclear installations.

Indeed, the use of an electrolyte of organic nature as described in reference [1], would lead to recovering the contaminants in an organic medium, totally incompatible with the systems for processing nuclear waste for which the concentration thresholds of organic materials are extremely low.

As to the use of an active repair mortar, as described in reference [2], the latter would, in order to recover the contaminants, require the application of scalping techniques which in the nuclear sector are unwieldy to apply and generate a too large amount of waste.

The inventors therefore set the goal of providing a method which is perfectly suitable for decontaminating materials with a cement matrix entering the structure of nuclear installations, notably in that, in addition to extracting very effectively the contaminants in particular the radio-elements of these materials, it allows easy recovery of these contaminants and this in the form of waste suitable for entering one of the systems for processing and conditioning nuclear waste.

The inventors also set the goal that this method should be simple to apply and this regardless of the configuration and of the arrangement of the materials which have to be decontaminated, and ends up by producing a volume of waste as reduced as possible.

DISCUSSION OF THE INVENTION

These objects and further other ones are achieved by the invention which proposes a method for electrokinetic decontamination of a porous solid medium, which comprises:

a) extracting the contaminating species present in this solid material in an electrolyte which is an essentially inorganic gel, this extraction being achieved by applying an electric current between two electrodes positioned at the surface and/ or inside the solid material, the contact of at least of one of these electrodes with said solid medium being ensured by a layer of said gel, b) drying the gel containing the thereby extracted contaminating species until a dry residue is obtained, which fractures, and c) removing the thereby obtained dry residue from said solid medium.

In the foregoing and in the following, by "essentially mineral gel" is meant a gel which does not comprise more than 10% by mass, preferably not more than 5% by mass and ideally, not more than 3% by mass of organic material(s).

According to the invention, this gel comprises from 10 to 40% by mass of an inorganic or mineral viscosifying agent, dispersed in 60 to 90% by mass of an aqueous phase with a basic pH.

The inorganic viscosifying agent, the function of which is to allow the gel to adhere onto a surface regardless of the configuration and arrangement on the one hand, and, to form when drying, a dry residue which fractures and is easily detached from this surface on the other hand, is preferably alumina or a mixture of alumina and silica, the presence of silica in the gel having indeed the advantage of reducing the drying rate of this gel as compared with what it is in the absence of silica for identical temperature and hygrometry conditions.

The aluminas which may be used according to the invention are calcinated aluminas, milled calcinated aluminas and pyrogenated aluminas such as for example the aluminas which are marketed by DEGUSSA AG under the names of Aeroxil® (Alu C, Alu 65, Alu 130, . . . ) and those which are marketed by CABOT under the names of SpectrAl® (51, 81 or 100).

Among these aluminas, pyrogenated aluminas are however preferred and in particular the alumina Aeroxil® Alu C which has a BET specific surface area of 100 $m^2/g$.

As for the silicas, they may as well be hydrophilic, hydrophobic, precipitated such as for example the silicas Tixosil® (38, 73, . . . ) from RHODIA, as pyrogenated such as for example the silicas which are marketed by DEGUSSA AG under the names of Aerosil® and those which are marketed by CABOT under the names of Cab-O-Sil® (M5, H5, EH5, . . . ).

Among these silicas, pyrogenated silicas are however preferred and in particular the silica Aerosil® 380 which has a BET specific surface area of 380 $m^2/g$.

According to the invention, the viscosifying agent preferably does not account for more than 30% by mass of the gel so as to give this gel relatively long drying time, i.e. in practice several days, at a temperature from 20 to 30° C. and at a relative hygrometry from 20 to 70%, independently of the fact whether it contains silica or not.

When the gel contains silica, the latter advantageously does not account for more than 5% by mass, and even better not more than 1% by mass of the viscosifying agent.

As indicated earlier, the aqueous phase of the gel is of a basic nature, the presence of a base in the gel actually having the advantage of increasing the electric conductivity of this gel and, in the case of a certain number of porous solid media such as for example materials with a cement matrix, of maintaining and/or re-establishing the pH of the portion of these media which is in contact with the gel and thereby avoiding the occurrence of acido-basic reactions detrimental to the integrity of the gel during step a), and, consequently detrimental to the yield of the decontamination.

This aqueous phase preferably is a solution of an inorganic base, in which case the latter is advantageously selected from soda, potash, calcium hydroxide, potassium carbonate, sodium carbonate and mixtures thereof and, even better from soda and potash, the hygroscopicity of which itself also contributes to reducing the drying rate of the gel.

Whatever the base used, the latter preferably is present in the aqueous phase in a concentration of at least 3 mol/L and, even better, at least 5 mol/L of aqueous phase, concentrations from 5 to 10 mol/L having proved to be particularly well suited.

According to the invention, the gel may further comprise a super-absorbent polymer so as to facilitate rehumidification of this gel during step a).

This polymer which may notably be selected from super-absorbent polymers marketed by ARKEMA under the names of Aquakeep® and Norsocryl® and mixtures of these polymers, preferably does not account for more than 1% by mass of the gel.

The gel may further comprise a surfactant, preferably a non-ionic surfactant, so as to give it rheological properties such that it may easily be sprayed, for example with a gun, on vertical surfaces of the walls or pillars type, or even on horizontal surfaces of the ceiling type without any risk of spreading. With the presence of a surfactant in the gel it is also possible to control the adherence of the dry residue obtained at the end of step b), relatively to the surface on which it is found and to control the size of the fragments resulting from the fracture of the gel.

This surfactant which may notably be selected from sequenced copolymers marketed by IFRACHIMIE under the names of Ifralan® and by BASF under the names of Pluronic® and the mixtures of these copolymers, preferably does not account for more than 5% by mass and, even better not more than 2% by mass of the gel.

According to a first embodiment of the method of the invention, the porous solid medium comprising an electrically conducting internal frame, one of the electrodes is formed by this frame or a portion of this frame, while the other electrode is formed by an electrically conducting member which is applied on a surface of the porous solid medium or implanted in this medium, in which case only the contact of this member with said medium is ensured by a gel layer.

According to another embodiment of the method of the invention, both electrodes are formed by electrically conducting members which are applied on two different surfaces of the porous solid medium, in which case the contact of each of these members with the medium is ensured by a gel layer.

According to still another embodiment of the method of the invention, both electrodes are formed by two electrically conducting members which are implanted into the porous solid medium, in which case the contact of each of the members with this medium is ensured by a gel layer.

In every case, the gel layer(s) preferably has(have) a thickness from 0.5 to 2 cm and even better from 1 to 2 cm so as to there again reduce the drying rate of the gel, experience having actually shown that the gel dries all the more rapidly since it is deposited in thinner layers, for identical temperature and hygrometry conditions.

Moreover their deposition on the electrodes and/or on the porous solid medium may be performed by quite conventional methods such as spraying, for example with a gun, or application by means of a paintbrush or a mortar board.

Insofar that drying of the gel is expressed by a drop in its electrical conductivity, step a) may comprise one or more operations consisting of re-humidifying the gel with an electrolytic solution, preferably with a composition identical to that of the aqueous phase of this gel, so as to return the electric conductivity of this gel to its original value. The formulation of the gel will however preferably be selected so as to avoid or at the very least limit the number of these operations.

The drying of the gel provided in step b) may be natural, i.e. result from evaporation of the aqueous phase of this gel in contact with the ambient air, or else be forced, i.e. by providing a heat source without any fan, of the infrared heating type. In every case, this drying is conducted until a dry residue is obtained which fractures, typically into flakes of millimetric dimensions.

The thereby obtained dry residue may then be easily removed, for example by brushing and/or suction.

The method of the invention has many advantages. In particular:
- it allows very efficient extraction from a porous solid medium, of contaminating species which are found in the depth of this medium;
- it allows very easy recovery of these contaminating species;
- it is simple to apply, notably in that it uses an electrolyte which may on the one hand be easily prepared from chemicals available commercially and, on the other hand, be easily used regardless of the configuration and of the arrangement of the porous solid mediums which have to be treated;
  - finally, because of their small volume and their mineral nature, the waste which it produces is suitable for entering one of the systems for treating and conditioning nuclear waste and this without having to be subject to any preliminary treatment.

It is therefore particularly well suited for removing contamination, notably by radio-elements (actinides and lanthanides) such as cesium, from materials with a cement matrix entering the structure of nuclear installations.

Other advantages and features of the invention will become apparent on reading the additional description which follows, given with reference to the appended figures.

It is obvious that this additional description is only given as an illustration of the object of the invention and should by no means be interpreted as a limitation of this object.

SHORT DESCRIPTION OF THE FIGURES

DETAILED DISCUSSION OF EMBODIMENTS OF THE METHOD ACCORDING TO THE INVENTION

First of all reference will be made to FIGS. 1 to 3 which illustrate as schematic drawings, three different embodiments of step a) of the method of the invention.

Figure 1:
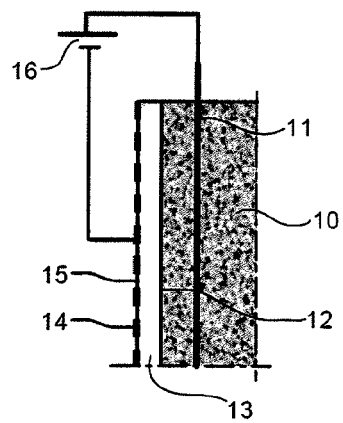
FIG. 1 is a schematic drawing of a first embodiment of step a) of the method of the invention.

The first of these embodiments, which is illustrated in FIG. 1, may be used for decontaminating a porous solid medium 10 comprising an electrically conducting internal frame 11, capable of playing the role of an electrode and a portion of which has been made accessible, and a free surface 12 substantially parallel to this frame.

Such a medium for example is a block of reinforced concrete or mortar.

In this case, a layer 13 of a gel as defined herein before, typically measuring from 0.5 to 2 cm in thickness, is applied on the surface 12, for example by spraying, with a paintbrush or a mortar board. Next, the gel layer 13 is covered with an electrically conducting member 14 also capable of playing the role of an electrode.

The gel layer 13 under operating conditions has a dual function: one of ensuring electrical continuity between the surface 12 of the porous solid medium 10 and the electrically conducting member 14 on the one hand; one of collecting and trapping contaminating species which, under the effect of the application of an electric current between the internal frame 11 and the electrically conducting member 14, will migrate towards this member on the other hand.

As this is visible in FIG. 1, the electrically conducting member 14 is preferably pierced with holes 15 in order to provide the operator with visual access to the gel layer 13, and to allow him/her, if necessary, to easily re-humidify this gel under the operating conditions, for example by spraying an electrolytic solution, typically with the same composition as the aqueous phase of the gel, through these holes.

Also, the electrically conducting member 14 is typically a plate with a metal grid, for example in stainless steel, in platinum, in titanium or the like.

Decontaminating a porous solid medium by carrying out step a) according to the embodiment illustrated in FIG. 1 is extremely easy.

Indeed, it is sufficient to connect the internal frame 11 and the electrically conducting member 14 to an electric power supply 16 so as to bias this frame and this member, one at the anode and the other at the cathode, so that the electrokinetic decontamination treatment may begin.

This bias should of course be suitably selected depending on the contaminating species for which extraction from the porous solid medium 10 is desired.

Thus, if the contaminating species to be extracted from the porous solid medium 10 are cationic species (positively charged), which for example is the case of heavy metals and radio-elements, then the internal frame 11 is biased as an anode while the electrically conducting member 14 is biased as a cathode.

On the other hand, if the contaminating species to be extracted from the porous solid medium 10 are anionic species (negatively charged) which for example is the case of chloride, fluoride and sulphide ions, then the internal frame 11 is biased as a cathode while the electrically conducting member 14 is biased as an anode.

The electrical current imposed to the internal frame 11 and to the electrically conducting element 14 may be direct or pulsed current. It is preferable that the current density should not exceed 5 A/m$^2$ of the internal frame in order to avoid any degradation of the material.

Drying of the gel may be appreciated, not only visually by the means of the holes 15 of the electrically conducting member 14, but also by tracking the resistance measured at the terminals of both electrodes (internal frame 11/electrically conducting member 14).

A notable increase in this resistance expresses drying of the gel and therefore insufficient electrical conductivity of the latter. By spraying an electrolytic solution through the holes 15 it is then possible to re-establish the electrical conductivity of the gel to its initial value.

When the decontamination requirements are achieved or when the gel is saturated with contaminants, the gel layer 13 is subject to drying which may be natural, by simple evaporation of the aqueous phase of the gel in contact with the ambient air) or forced (by providing a heat source of the infrared heating type) until a dry residue is obtained which fractures typically into flakes with millimetric dimensions.

After removal of the electrically conducting member 14, this residue may then be easily removed from the surface 12, for example by brushing this surface and/or by suction of the residue.

As an example, in order to remove contamination by radioelements from a block of reinforced concrete, having as an internal frame, a wire mesh with meshes comprised between 3.5 and 4 cm, formed by iron rods measuring 8 mm in diameter and connected together at each node by an iron wire, it will be possible to use:

the internal frame of this block as an anode, a 2 cm thick layer of gel comprising 23.7% by mass of alumina Aeroxil® Alu C, 1% by mass of silica Aerosil® 380 and a 5 M solution of potash as an electrolyte, a plate of titanium pierced with circular holes measuring 8 mm in diameter and spaced out apart from each other by 3 mm, as a cathode, and an average electric current density of 2 $A/m^2$ of internal frame.

Figure 2:
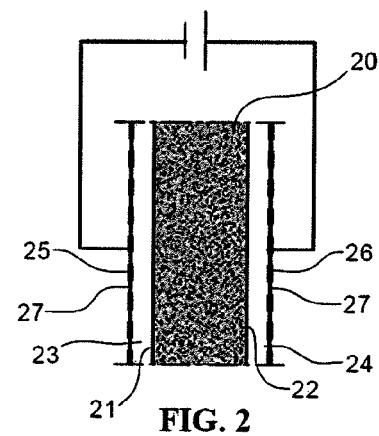
FIG. 2 is a schematic drawing of a second embodiment of step a) of the method of the invention.

Reference is now made to FIG. 2 which schematically illustrates a second embodiment of step a) of the method of the invention, which only differs from the previous one in that both electrodes required for applying the electric current in the porous solid medium are both added onto this medium.

This second embodiment may typically be used for decontaminating a porous solid medium 20 which is without any electrically conducting internal frame, but which comprises two opposite free surfaces 21 and 22, respectively, on which may be added two electrically conducting elements suitable for playing the role of electrodes.

Such a medium for example, is a block of non-reinforced concrete or mortar.

In this case, a layer 23 and 24, respectively of a gel as defined earlier is applied on each of the surfaces 21 and 22 and then each of these layers is covered with an electrically conducting element, 25 and 26 respectively.

There also, these electrically conducting elements are preferably pierced with holes 27 for the same reasons as those mentioned earlier for the electrically conducting element 14 shown in FIG. 1.

The decontamination of a porous solid medium by performing step a) according to this embodiment is accomplished on the same principle as according to the embodiment illustrated in FIG. 1, except that with the accessibility of both electrically conducting elements 25 and 26, it is possible to choose to bias these elements, one as an anode and the other as a cathode, independently of the charge of the contaminating species which have to be extracted from this medium.

Figure 3:
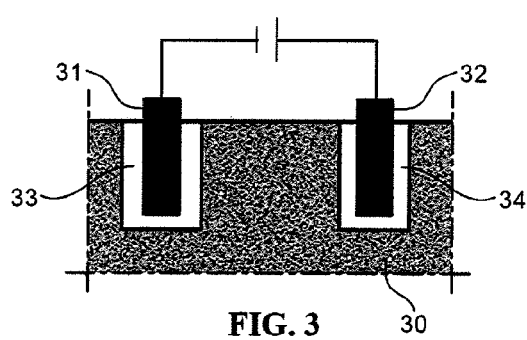
FIG. 3 is a schematic drawing of a third embodiment of step a) of the method of the invention.

Reference is further made to FIG. 3 which schematically illustrates a third embodiment of step a) of the method of the invention.

This third embodiment may typically be used for decontaminating:

either a porous solid medium 30 which, not only is without any electrically conducting internal frame but which further does not have two free surfaces on which electrically conducting elements may be attached, such as for example geological soil, or a very localized area of a porous solid medium 30 for example following accidental contamination and this whether the medium comprises an electrically conducting internal frame or not, or further an area of a porous solid medium 30 which comprises an electrically conducting internal frame but in which the depth of the contamination is greater than the thickness of the coating of this frame.

In every case, two candle-shaped electrodes 31 and 32 respectively are implanted into the porous solid medium 30, optionally in housings laid out beforehand for this purpose, for example by means of corings, while being placed on either side of the area of said medium which has to be decontaminated.

The electrical continuity between the electrodes 31 and 32 and the porous solid medium which surrounds them is ensured by a gel layer 33 and 34 respectively, which is either deposited on the surface of the electrodes before implantation or deposited on the wall of the housings intended to receive these electrodes.

The decontamination of a porous solid medium by performing step a) according to this embodiment is accomplished on the same principle as according to the embodiment illustrated in FIG. 2, except that the steps for drying and removing the gel are performed after having removed the electrodes from the solid medium.

EXPERIMENTAL RESULTS

The gels used in the following examples were all prepared by using the same procedure.

The latter consists of pouring the viscosifying agent (which is either Aeroxil® Alu C, or a mixture of Aeroxil® Alu C alumina and of Aerosil® 380 silica) into water, or if necessary into a soda or potash solution maintained under mechanical stirring, at a rate comprised between 600 and 800 rpm, and of continuing the stirring of the thereby obtained mixture for 2 to 5 minutes so as to obtain a homogeneous gel.

Example 1

This example deals with the influence of a certain number of parameters on the drying kinetics of the gel used as an electrolyte in the method of the invention.

Figure 4:
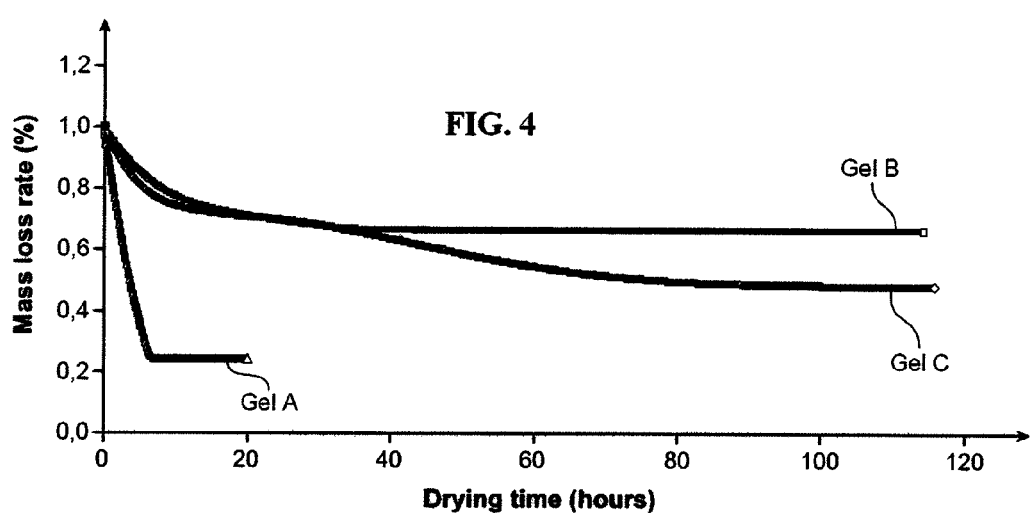
FIG. 4 is a graph illustrating the influence of the presence of soda or potash in the aqueous phase of a gel on the drying kinetics of this gel.

Influence of the Presence of Soda or Potash in the Aqueous Phase of the Gel:

FIG. 4 illustrates in the form of curves, the drying kinetics (i.e., the mass loss rates versus the drying time) of three gels designated hereafter as gels A, B and C and respectively comprising:

Gel A: 23.7% by mass of Aeroxil® Alu C alumina and 76.3% by mass of water;

Gel B: 23.7% by mass of Aeroxil® Alu C alumina and 76.3% by mass of a 5M KOH solution;

Gel C: 23.7% by mass of Aeroxil® Alu C alumina and 76.3% by mass of a 5M NaOH solution.

These drying kinetics were obtained for gel layers with a thickness of 2 mm, at 22° C. and at 60% relative humidity.

As shown by this figure, the drying rate of a gel is considerably reduced by the presence of soda or potash in the aqueous phase of this gel.

Indeed, because of the hygroscopicity of these bases, the competition between the process for evaporating the aqueous phase of the gel and that of water re-absorption related to the presence of soda or potash in this aqueous phase gives the possibility of delaying the obtaining of the plateau which expresses total elimination of the free water contained in the gel.

A gel for which the aqueous phase contains potash or soda therefore conducts electrical current for longer time than a gel, the aqueous phase of which is only formed with water.

This was notably confirmed by submitting layers of gel B with a thickness of 2 mm to dry under an electric field with an intensity of 8 mA, at 22° C. and at 60% relative humidity, by following the change in the electric resistance and in the mass of these layers over time.

Figure 5:
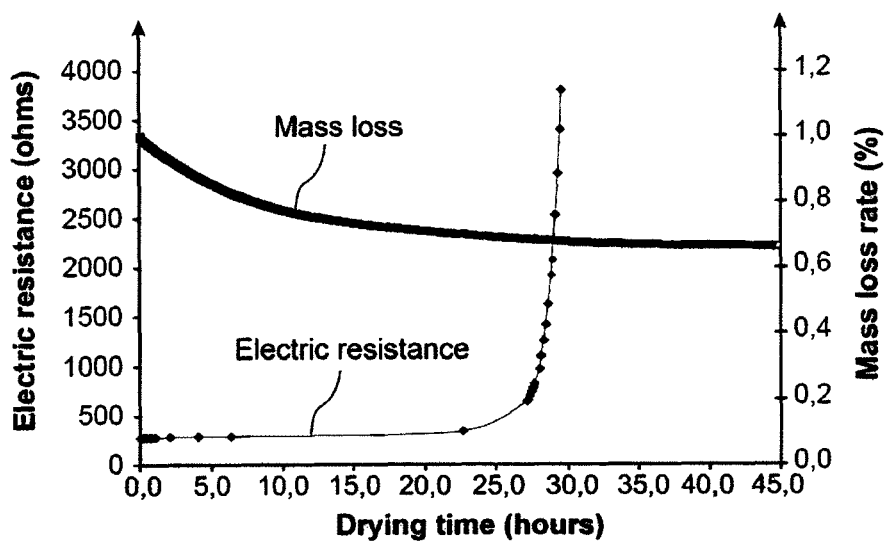
FIG. 5 is a graph illustrating the time-dependent change of the electric resistance and of the mass of a gel, the aqueous phase of which contains potash when this gel is subject to drying under an electric field.

Indeed, as shown in FIG. 5 which shows the results of this experiment, the electric resistance and therefore the electric conductivity of the gel prove to be of great stability during its drying.

This is particularly interesting since it guarantees uniform operating conditions as long as the gel is not totally dry.

Figure 6:
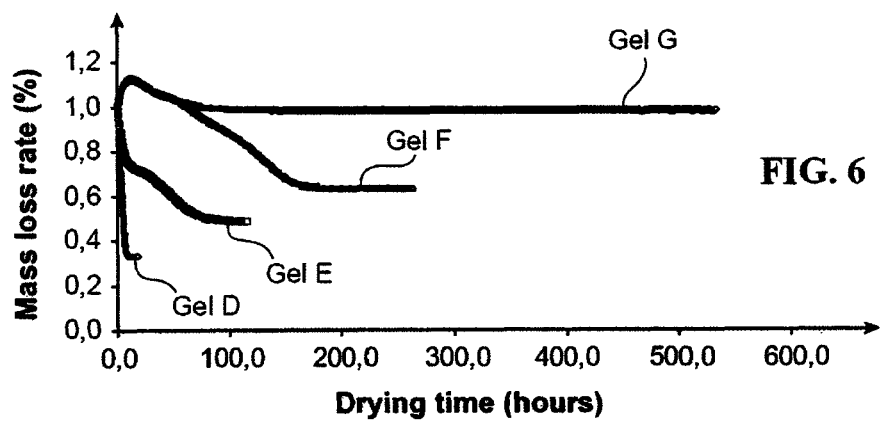
FIG. 6 is a graph illustrating the influence of the pH of a gel on the drying kinetics of this gel.

Influence of the pH of the Gel:

FIG. 6 illustrates in the form of curves drying kinetics of four gels designated hereafter as gels D, E, F and G and respectively comprising:

Gel D: 23.7% by mass of Aeroxil® Alu C alumina and 76.3% by mass of a 1 M NaOH solution;
Gel E: 23.7% by mass of Aeroxil® Alu C alumina and 76.3% by mass of a 5 M NaOH solution;
Gel F: 23.7% by mass of Aeroxil® Alu C alumina and 76.3% by mass of a 10 M NaOH solution;
Gel G: 23.7% by mass of Aeroxil® Alu C alumina and 76.3% by mass of a 10M KOH solution.

These drying kinetics were obtained for gel layers with a thickness of 2 mm, at 22° C. and at 60% relative humidity.

FIG. 6 shows that:

for a given base, the drying rate of a gel is all the more slower since its concentration in this base is high, on the one hand, and it is possible by acting on the basicity of a gel to modulate the drying rate of this gel and to adapt at best this rate to the duration of the decontamination treatment on the other hand.

Thus, for the decontamination of materials with a cement matrix where the extraction kinetics are of several weeks (typically from 2 to 4 weeks), the use of a gel with a very high soda or potash concentration will be preferred in order to limit as far as possible the number of operations for re-humidifying this gel.

Figure 7:
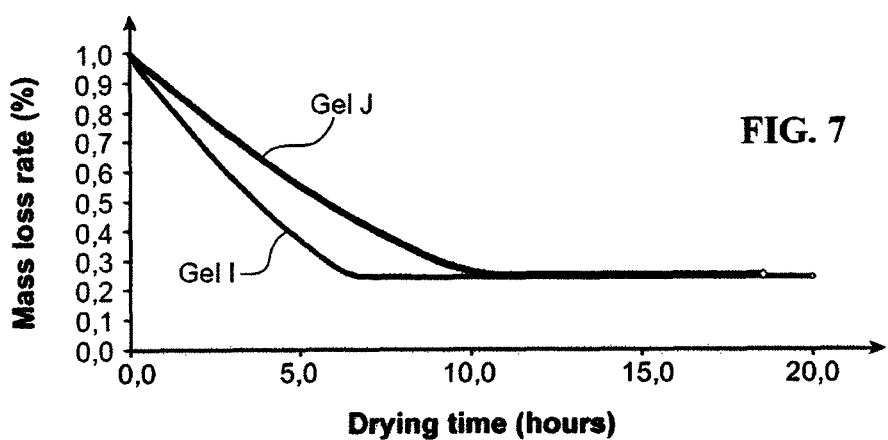
FIG. 7 is a graph illustrating the influence of the presence of silica in a gel on the drying kinetics of this gel.

Influence of the Presence of Silica in the Gel:

FIG. 7 illustrates, in the form of curves, the drying kinetics of two gels designated hereafter as gels I and J and respectively comprising:

Gel I: 23.7% by mass of Aeroxil® Alu C alumina and 76.3% by mass of water;
Gel J: 23.5% by mass of Aeroxil® Alu C alumina, 1% by mass of Aerosil® 380 and 75.5% by mass of water.

These drying kinetics were obtained for gel layers with a thickness of 2 mm, at 22° C. and 60% relative humidity.

This figure shows that the presence of silica in the gel also contributes to reducing the drying rate of this gel.

Figure 8:
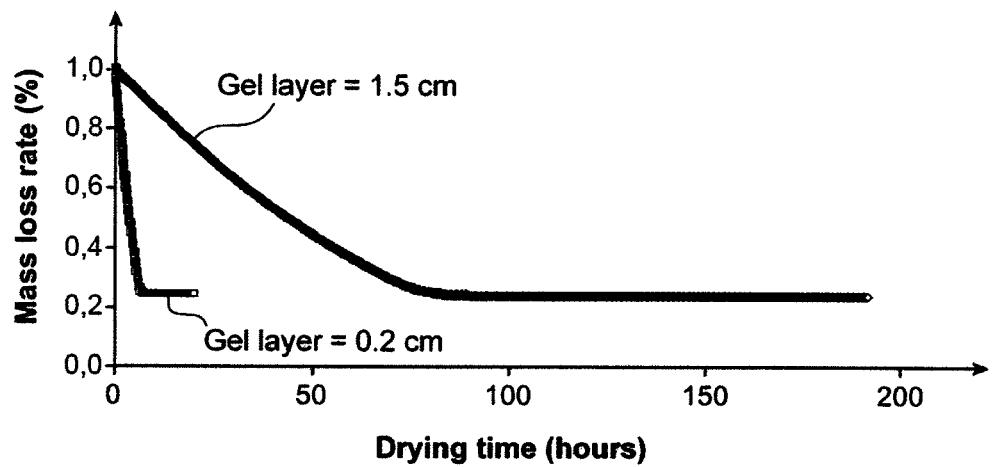
FIG. 8 is a graph illustrating the influence of the thickness of the deposit of a gel on the drying kinetics of this gel.

Influence of the Thickness of the Gel Deposit:

FIG. 8 illustrates in the form of curves, the drying kinetics obtained for a gel comprising 23.7% by mass of Aeroxil® Alu C alumina and 76.3% by mass of water when the latter is deposited in layers of 0.2 cm or of 1.5 cm.

These drying kinetics were obtained at 22° C. and at 60% relative humidity.

This figure shows that the thickness of the gel layer itself also contributes to reducing the drying rate of this gel.

Example 2

A test for decontaminating a cesium-contaminated mortar was conducted:

by extracting the cesium from the mortar according to the embodiment illustrated in FIG. 1, with
a gel comprising 23.5% by mass of Aeroxil® Alu C alumina and 76.3% by mass of a 5M NaOH solution, and
the following parameters: deposition of the gel in a layer with a thickness of 0.5 cm; application to the electrodes of an electric current density of 2 $A/m^2$ of internal frame; temperature of 22° C.; 60% relative hygrometry.

The extraction was conducted for 260 hours. Gel samples were taken at different moments of this extraction, and then subject to natural drying under ambient laboratory conditions and their cesium and aluminium contents were determined.

Figure 9:
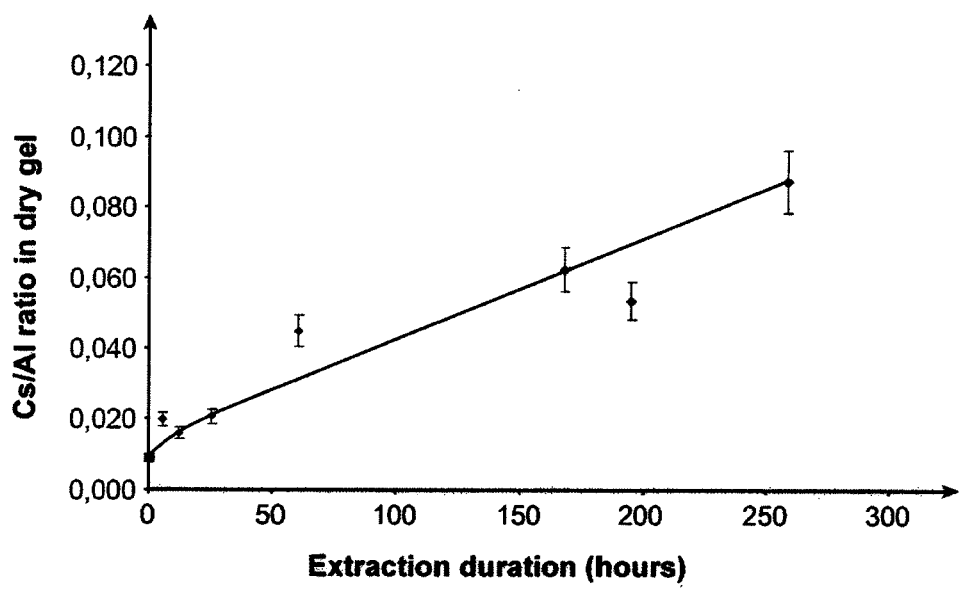
FIG. 9 is a graph illustrating the time-dependent change of the cesium content of a gel as observed when this gel is used as an electrolyte for decontaminating a mortar.

FIG. 9 shows the time-dependent change of the ratio of the cesium content to the aluminium content of the dry gel versus the duration of the extraction of cesium.

CITED REFERENCES

[1] EP-A-0 398 117
[2] FR-A-2 770 839

The invention claimed is:

1. A method for electrokinetically removing contaminating species from a depth of a porous solid material coming from a nuclear installation, the material comprising a matrix and an electrically conducting frame located within the matrix, which method comprises:
 (a) applying to an external surface of the porous solid material a layer of an electrolyte and a first electrode formed by an electrically conducting element, the electrolyte being an essentially inorganic gel comprising from 10 to 40% by mass of an inorganic viscosifying agent, dispersed in 60 to 90% by mass of an aqueous phase with a basic pH and no more than 5% by mass of an organic material, and the layer of the electrolyte ensuring an electrical contact between the external surface and the first electrode;
 (b) extracting the contaminating species from the depth of the porous solid material into the layer of the electrolyte, by applying an electric current between the first electrode and a second electrode, the second electrode being formed by at least a portion of the electrically conducting frame;
 (c) drying the layer of the electrolyte containing the extracted contaminating species until a dry residue is obtained which fractures, and
 (d) removing the first electrode and the fractured dry residue from the external surface of the porous solid material.

2. The method according to claim 1, wherein the inorganic viscosifying agent is alumina or a mixture of alumina and silica.

3. The method according to claim 2, wherein the viscosifying agent is pyrogenated alumina or a mixture of pyrogenated alumina and pyrogenated silica.

4. The method according to claim 1, wherein the viscosifying agent does not account for more than 30% by mass of the electrolyte.

5. The method according to claim 1, wherein an aqueous phase of the electrolyte is a solution of an inorganic base selected from soda, potash, calcium hydroxide, potassium carbonate, sodium carbonate, and mixtures thereof.

6. The method according to claim 5, wherein the inorganic base is present in the aqueous phase at a concentration of at least 3 mol/L of aqueous phase.

7. The method according to claim 1, wherein the electrolyte further comprises a super-absorbent polymer or a surfactant.

8. The method according to claim 1, wherein the layer of the electrolyte has a thickness from 0.5 to 2 cm.

9. The method according to claim 1, wherein the matrix is a cement matrix.

10. The method according to claim 1, wherein the contaminating species are radio-elements.

11. A method for electrokinetically removing contaminating species from a depth of a porous solid material coming from a nuclear installation, which method comprises:
  a) applying to a first external surface of the porous solid material a first layer of an electrolyte and a first electrode, and to a second external surface of the porous solid material a second layer of the electrolyte and a second electrode, each of the first and second electrodes being formed by an electrically conducting element, the electrolyte being an essentially inorganic gel comprising from 10 to 40% by mass of an inorganic viscosifying agent, dispersed in 60 to 90% by mass of an aqueous phase with a basic pH and no more than 5% by mass of an organic material, the first layer of the electrolyte ensuring an electrical contact between the first external surface and the first electrode and the second layer of the electrolyte ensuring an electrical contact between the second external surface and the second electrode;
  b) extracting the contaminating species from the depth of the porous solid material into the first and second layers of the electrolyte, by applying an electric current between the first and second electrodes;
  c) drying the first and second layers of the electrolyte comprising the extracted contaminating species until a first and a second dry residues are obtained which fracture; and
  d) removing the first and second electrodes and the first and second fractured dry residues from the first and second external surfaces of the porous solid material.

12. The method according to claim 11, wherein the inorganic viscosifying agent is alumina or a mixture of alumina and silica.

13. The method according to claim 12, wherein the viscosifying agent is pyrogenated alumina or a mixture of pyrogenated alumina and pyrogenated silica.

14. The method according to claim 11, wherein the viscosifying agent does not account for more than 30% by mass of the electrolyte.

15. The method according to claim 11, wherein the aqueous phase of the electrolyte is a solution of an inorganic base selected from soda, potash, calcium hydroxide, potassium carbonate, sodium carbonate and mixtures thereof.

16. The method according to claim 15, wherein the inorganic base is present in the aqueous phase at a concentration of at least 3 mol/L of aqueous phase.

17. The method according to claim 11, wherein the electrolyte further comprises a super absorbent polymer and/or a surfactant.

18. The method according to claim 11, wherein the first and second layers of the electrolyte have a thickness from 0.5 to 2 cm.

19. The method according to claim 11, wherein the porous solid material is a material with a cement matrix.

20. The method according to claim 11, wherein the contaminating species are radio-elements.

21. A method for electrokinetically removing contaminating species from a depth of a porous solid material coming from a nuclear installation, which method comprises:
  a) introducing into a first housing of the porous solid material a first layer of an electrolyte and a first electrode, and into a second housing of the porous solid material a second layer of the electrolyte and a second electrode, each of the first and second electrodes being formed by an electrically conducting element, the electrolyte being an essentially inorganic gel comprising from 10 to 40% by mass of an inorganic viscosifying agent, dispersed in 60 to 90% by mass of an aqueous phase with a basic pH and no more than 5% by mass of an organic material, the first layer of the electrolyte ensuring an electrical contact between a wall of the first housing and the first electrode and the second layer of the electrolyte ensuring an electrical contact between a wall of the second housing and the second electrode;
  b) extracting the contaminating species from the depth of the porous solid material into the first and second layers of the electrolyte, by applying an electric current between the first and second electrodes;
  c) drying the first and second layers of the electrolyte comprising the extracted contaminating species until a first and a second dry residues are obtained which fracture; and
  d) removing the first and second electrodes and the first and second fractured dry residues from the first and second housings of the porous solid material.

22. The method according to claim 21, wherein the inorganic viscosifying agent is alumina or a mixture of alumina and silica.

23. The method according to claim 22, wherein the viscosifying agent is pyrogenated alumina or a mixture of pyrogenated alumina and pyrogenated silica.

24. The method according to claim 21, wherein the viscosifying agent does not account for more than 30% by mass of the electrolyte.

25. The method according to claim 21, wherein the aqueous phase of the electrolyte is a solution of an inorganic base selected from soda, potash, calcium hydroxide, potassium carbonate, sodium carbonate and mixtures thereof.

26. The method according to claim 25, wherein the inorganic base is present in the aqueous phase at a concentration of at least 3 mol/L of aqueous phase.

27. The method according to claim 21, wherein the electrolyte further comprises a super absorbent polymer and/or a surfactant.

28. The method according to claim 21, wherein the first and second layers of the electrolyte have a thickness from 0.5 to 2 cm.

29. The method according to claim 21, wherein the porous solid material is a material with a cement matrix.

30. The method according to claim 21, wherein the contaminating species are radio-elements.

* * * * *